United States Patent [19]

Redelman et al.

[11] 4,046,267
[45] Sept. 6, 1977

[54] WAREHOUSE STORAGE SYSTEM WITH A MULTIVEHICLE ARRANGEMENT HAVING POWER COUPLING MEANS

[75] Inventors: Paul E. Redelman, South Holland; Donald H. Busam, Hometown, both of Ill.

[73] Assignee: Interlake, Inc., Oak Brook, Ill.

[21] Appl. No.: 626,769

[22] Filed: Oct. 29, 1975

Related U.S. Application Data

[63] Continuation of Ser. No. 336,887, Feb. 28, 1973, abandoned.

[51] Int. Cl.² ............................................... B65G 1/06
[52] U.S. Cl. ............................... 214/16.4 B; 180/1 C; 180/14 E
[58] Field of Search ............... 104/48; 105/26 R, 26.1, 105/90 A, 159, 215 C; 180/1 C, 14 E, 14 C, 20–24; 214/16.4 B; 187/8.56, 8.57

[56] References Cited

U.S. PATENT DOCUMENTS

| | | | |
|---|---|---|---|
| 881,008 | 3/1908 | Knut | 105/159 |
| 2,014,769 | 9/1935 | Kossakowski | 105/159 |
| 1,227,389 | 5/1917 | Cock | 105/159 |
| 1,348,324 | 8/1920 | Scully | 180/1 C |
| 1,829,808 | 11/1931 | Opolo | 180/23 |
| 2,161,818 | 6/1939 | Joy | 180/1 C |
| 2,250,070 | 7/1941 | Simmons | 180/1 C |
| 2,751,854 | 6/1956 | Pedersen | 105/159 |
| 3,788,499 | 1/1974 | Burns et al. | 214/16.4 B |

FOREIGN PATENT DOCUMENTS

| | | | |
|---|---|---|---|
| 1,352,503 | 1/1964 | France | 180/1 C |
| 602,296 | 9/1934 | Germany | 180/1 C |
| 1,530,274 | 10/1969 | Germany | 105/159 |
| 391,479 | 9/1965 | Switzerland | 180/23 |

*Primary Examiner*—Robert J. Spar
*Assistant Examiner*—R. B. Johnson
*Attorney, Agent, or Firm*—Allegretti, Newitt, Witcoff & McAndrews

[57] ABSTRACT

In a storage installation, a load carrier drive for propelling a load carrier longitudinally in the aisles between storage frames includes a rotating coupling member driven by the drive for contacting and driving the drive of a transfer car when the load carrier is positioned for transfer by the transfer car, whereby the transfer car is propelled by the load carrier drive.

9 Claims, 6 Drawing Figures

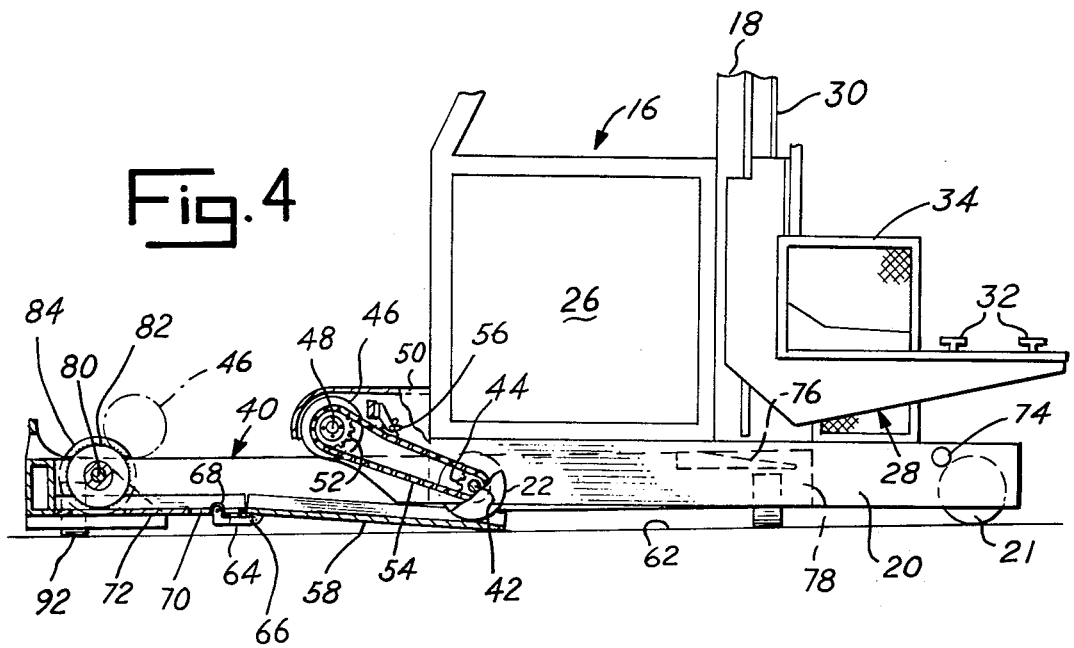
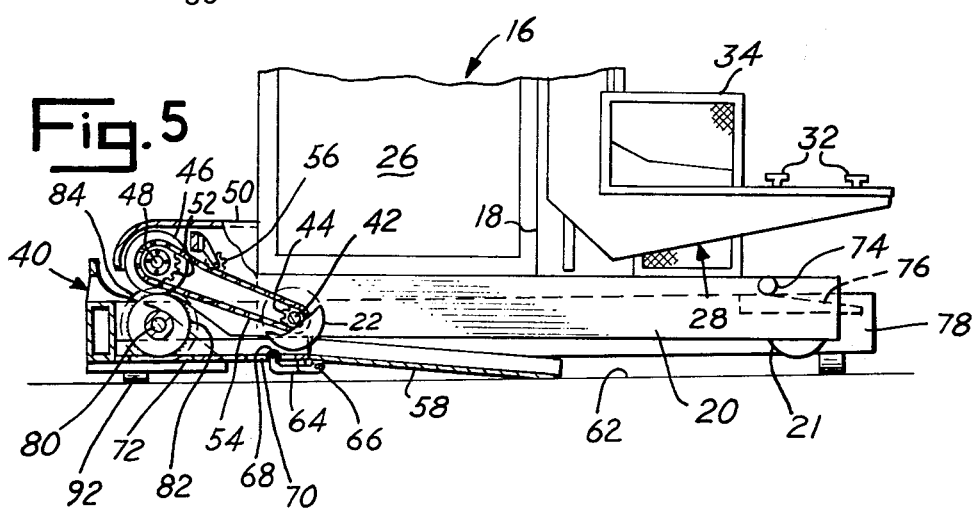
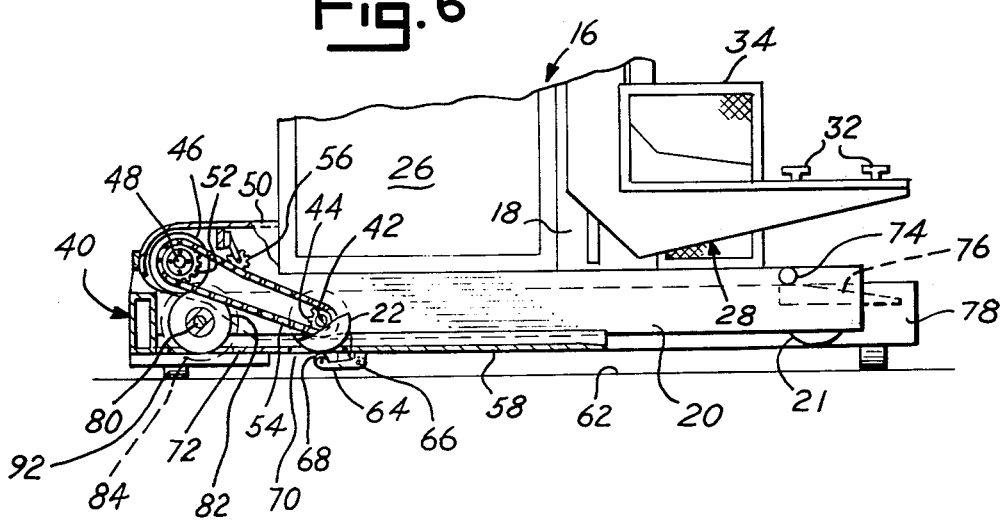

WAREHOUSE STORAGE SYSTEM WITH A MULTIVEHICLE ARRANGEMENT HAVING POWER COUPLING MEANS

RELATED APPLICATION

This application is a continuation of application Ser. No. 336,887, filed Feb. 28, 1973, now abandoned.

BACKGROUND AND SUMMARY OF THE INVENTION

This invention relates to a multivehicle arrangement and, more particularly, to an improved load carrier and transfer car construction for use in a storage installation.

In mechanized storage and retrieval installations, a load carrier vehicle is usually provided for operation in one or more aisles between the storage frames of the installation for the handling of articles which are to be stored in and retrieved from the frames. Particularly where the load carrier is a large and rather expensive vehicle, a transfer car or other transfer mechanism is frequently provided for transferring the load carrier between several different aisles for operation alternately in these aisles. In such installations, the load carrier is usually provided with its own power drive train for operation of the load carrier in the aisles and for positioning the load carrier onto the transfer car for transfer between the aisles. Once the load carrier has been fully positioned for transfer on the transfer car, its drive train is secured and a separate and distinct drive train on the transfer car is activated to propel the transfer car between the aisles. Thus, at least a pair of drive motors or other motive means are required, one for propelling the transfer car and one for propelling the load carrier. Since both the transfer car and the load carrier are frequently of substantial size, both of the motors or other motive devices are, of necessity, fairly large and expensive. Moreover, in such dual motor installations, it is generally necessary to provide complex and expensive electrical safety circuitry and controls, for example, to prevent premature or accidental activation of the transfer car before the load carrier is fully positioned on the transfer car for transport, to prevent activation of the load carrier during transfer, etc.

In the multivehicle arrangement constructed in accordance with the principles of the present invention, one of the two previously mentioned motors may be eliminated and a substantial reduction in complex and elaborate safety circuitry may be realized. In an arrangement incorporating the principles of the present invention, both the load carrier and the transfer car may be propelled by way of a single motor or other motive device. In the arrangement incorporating the principles of the present invention, both the transfer car and the load carrier may run directly on the floor of the storage installation without the provision of pits, rails and other expensive and dangerous constructions. In the installation incorporating the principles of the present invention, the load carrier may be backed into its transfer or transport position on the transfer car and finally and fully positioned in the transport position by way of its own drive means in a manner which insures proper positioning and the load carrier may be automatically secured against movement during transfer. Moreover, in the arrangement incorporating the principles of the invention, the drive of a load carrier may be automatically coupled to the drive of the transfer car as the load carrier is being positioned for transport by the transfer car and the transfer car may be propelled by the load carrier drive.

In a principal aspect of the present invention, a multivehicle arrangement includes a first vehicle and a second vehicle which is adapted to transport the first vehicle. Coupling means couples the first and second vehicles together automatically when the first vehicle is positioned for transport by the second vehicle and transfers power from the first vehicle to the drive means of the second vehicle to propel the second vehicle.

In another principal aspect of the present invention, the coupling means mechanically couples the drive means of the first vehicle and the drive means of the second vehicle such that the first vehicle drive means mechanically drives the second vehicle drive means.

In still another principal aspect of the invention, the improvement in a storage and retrieval installation includes drive means on the load carrier of the installation for propelling the load carrier in the aisles of the installation, for fully positioning the load carrier on the transfer vehicle of the installation and for elevating the load carrier above the plane in which the load carrier normally moves when the load carrier is positioned in the transfer position.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 4 is a cross-sectioned elevation view of the transfer car, as viewed substantially along lines 4 — 4 in FIG. 2, and load carrier of the present invention showing the load carrier being positioned upon the transfer car for transport;

FIG. 5 is an elevation view of the load carrier and transfer car shown in FIG. 4, but in which the load carrier has been moved to an advanced position prior to its final positioning for transport on the transfer car; and FIG. 6 is an elevation view of the load carrier and transfer car shown in FIG. 5, but in which the load carrier has been fully positioned upon the transfer car for transport.

DESCRIPTION OF THE PREFERRED EMBODIMENT

Figure 1:
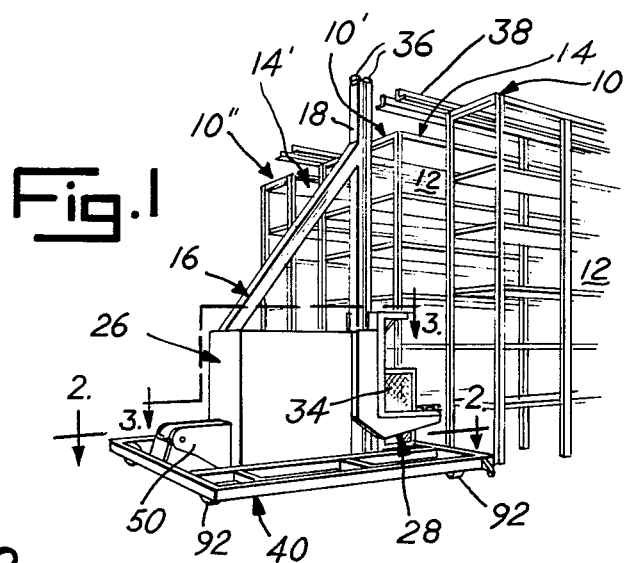
FIG. 1 is a perspective view of a preferred embodiment of storage and retrieval system incorporating the principles of the present invention.

Referring to FIG. 1, a multivehicle arrangement incorporating the principles of the present invention is shown in which the arrangement is embodied in a storage and retrieval installation of a mechanized storage system. Such storage and retrieval system, in general, includes a plurality of spaced storage frames 10, 10' and 10" having a plurality of suitable storage bins 12 spaced both vertically and horizontally of each other for receiving and holding the articles which are to be stored in and retrieved from the system. The respective storage frames are spaced from each other so as to define aisles 14 and 14' therebetween in which a suitable load carrier or vehicle 16 is adapted to longitudinally move up and down aisles 14 and 14' for the insertion and removal of desired articles into and from the bins. It will be understood that although only three storage frames and two aisles are shown, the system may, and usually does, include many more aisles and frames than those shown.

Figure 3:
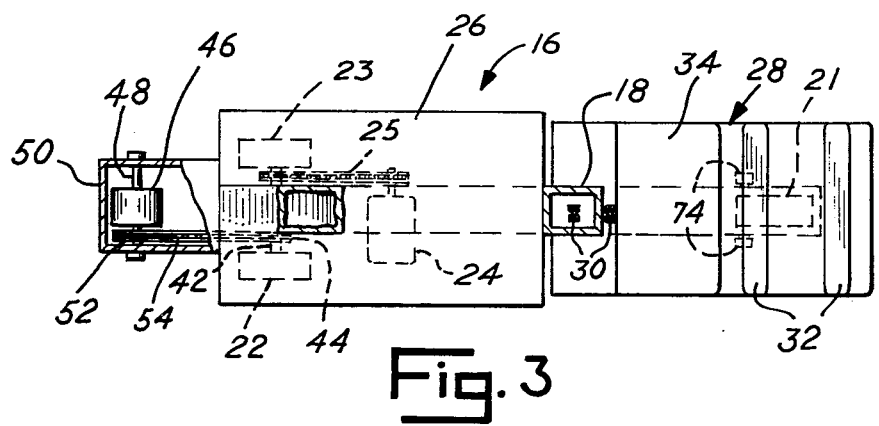
FIG. 3 is a plan view, as viewed along lines 3 — 3 of FIG. 1, of a preferred embodiment of the load carrier of the storage and retrieval system of the present invention.

The load carrier 16 preferably includes a vertically extending mast 18 which extends upward from a suitable support bed 20, as shown in FIG. 4. The load carrier is adapted to be drivingly supported upon wheels or tires 21, 22 and 23 for movement upon the floors of the aisles 14 and 14'. At least one set of these wheels, e.g. 22 and 23, is preferably powered by a suitable drive motor or the like 24 by way of a drive chain 25 contained within the control housing 26 as shown in FIG. 3.

Such load carrier 16 also typically includes an elevatable lift platform 28 which is adapted to move up and down the mast 18 by way of hoist chains 30 such that its transversely extendible article handling forks 32 or other suitable article handling means may be positioned in elevation adjacent the bin 12 in which it is desired to store and retrieve a given article and the forks 32 may be inserted into the bins. Although not essential to the present invention, and operator's cage 34 may also be mounted on the lift platform 28 in which an operator may position himself to operate the load carrier.

Suitable guide means is preferably provided for guiding the load carrier for movement in the aisles. As shown in FIG. 1, such guide means may include, for example, rollers 36 which are positioned adjacent the upper end of the mast 18 of the load carrier and which engage an overhead guide rail 38 to guide the movement of and steady the load carrier in the aisles 14 and 14' of the storage bins during article handling operations.

The storage and retrieval installation of the present invention also includes a floor running transfer car or vehicle 40 which is adapted to move transversely of the aisles 14 and 14' upon the floor of the storage space adjacent the ends of the aisles. The transfer car 40 supportably receives the load carrier 16 thereon, such that when the load carrier is positioned upon the transfer car for transfer, the transfer car and load carrier may be moved transversely of the aisles to enable the load carrier to operate in more than one given aisle. If necessary, a superstructure (not shown) may be provided on the transfer car 40 which cooperates with the rollers 36 at the top of mast 18 to steady the load carrier during transfer.

Referring particularly to FIGS. 3-6, the drive shaft 42 of the load carrier drive wheels 22 and 23 includes a sprocket 44 firmly mounted between the wheels for rotation with the drive shaft. A movable coupling surface in the form of a wheel 46 is mounted for rotation on a drive shaft 48 supported within a protective housing 50 extending from the rear of the load carrier 16. Wheel 46 is spaced longitudinally from wheels 22 and 23 and is preferably positioned somewhat above the latter wheels in elevation. A driven sprocket 52 is also mounted for rotation with shaft 48 and a flexible endless sprocket drive chain 54 is connected between sprocket 44 and sprocket 52. A small spring loaded tensioning sprocket 56 as shown in FIGS. 4-6, is also preferably mounted within housing 50 and engages the chain 54 to remove undesirable slack from the chain.

A pair of pivotable ramps 58 are pivotally mounted within the bay or berth 60 of the transfer car 40 into which the load carrier is positioned for transfer. The ramps 58 are spaced from each other by a distance substantially equal to the spacing of wheels 22 and 23 such that as the load carrier is propelled into the berth 60 by its rear drive wheels 22 and 23, these wheels will ride up the ramps and the rear of the load carrier as shown in FIGS. 4 and 5 will be elevated above the floor surface 62 beneath the transfer car.

The ramps also include a biasing arm 64 rigidly attached to the upper end of each of the ramps 58 adjacent their pivot 66. The arm 64 includes an elongate portion terminating at an idler roller 68 which is rotatably mounted at the end of the arm and which faces upward through an opening 70 in the support bed 72 of the transfer car 40.

As shown in FIGS. 3-6, the load carrier 16 also includes a pair of support rollers 74 adjacent its front end which extend laterally from the sides of the bed 20 of the load carrier 16. The support rollers 74 are positioned such that as the load carrier 16 is being backed into the transfer car berth 60, the rollers will engage and ride up inclined ramps 76 which are stationarily fixed to the beams 78 defining the berth of the transfer car such that the front wheel 21 of the load carrier will also be elevated above the floor 62 during positioning of the load carrier into berth 60 for transport by the transfer car.

Figure 2:
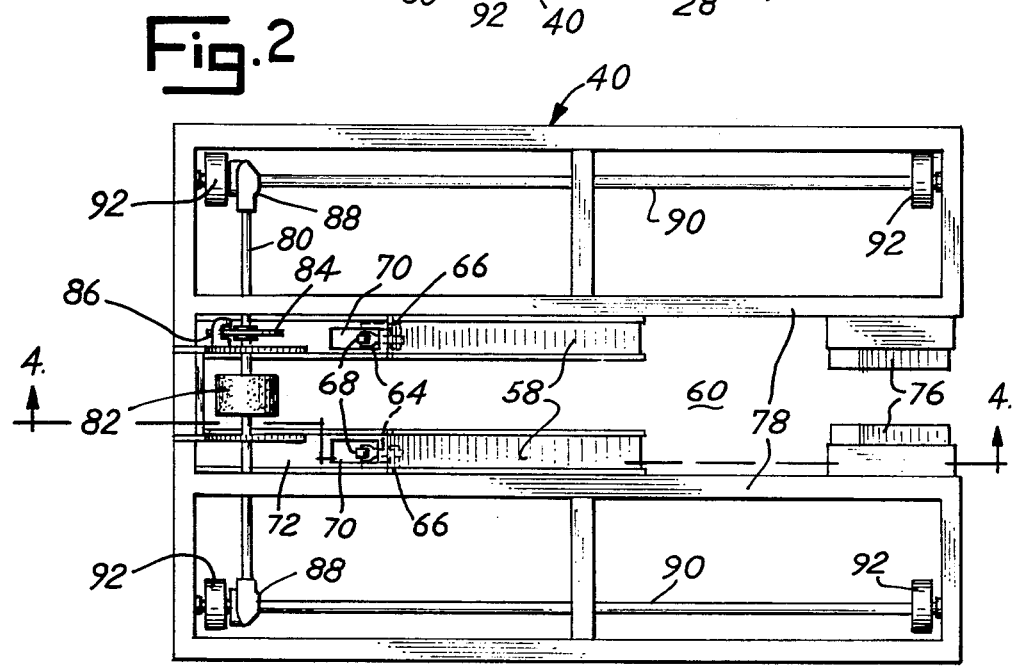
FIG. 2 is a plan view, as viewed along lines 2 — 2 of FIG. 1, of a preferred embodiment of transfer car of the storage and retrieval system of the present invention.

As shown particularly in FIG. 2, the transfer car 40 includes a drive shaft 80 extending the width of the transfer car and having a movable surface, in the form of a drum or wheel 82 rigidly secured to the drive shaft at the rear of the berth 60. Wheel 82 is positioned such that it is in alignment with the wheel 46 of the load carrier in a direction of movement of the load carrier into the berth. The axis of rotation of the wheel 82, as defined by the drive shaft 80, is somewhat below the rotational axis of wheel 46, but the highest point of elevation on the perimeter of the wheel 82 is somewhat above the minimum peripheral elevation of wheel 46, as shown in FIG. 4. The purpose of this relationship will be described in further detail in the description of the operation of the present invention.

A brake, preferably in the form of a disc brake having a disc 84, is also rigidly mounted to the shaft 80 and one or more brake cylinders 86 mounted to the frame of the transfer car are positioned so as to selectively engage the disc 84 to brake the rotation of the shaft 80. The brake cylinders 86 may be electrically actuated. However, other forms of actuation and braking are contemplated within the principles of the present invention.

The drive shaft 30 is attached at each end to a gear box 88 which, in turn, drives shafts 90 upon which the drive wheels 92 of the transfer car are mounted at spaced corners on the transfer car.

The wheels 46 and 82 are adapted to firmly frictionally engage each other as shown in FIGS. 5 and 6, both during the positioning of the load carrier 16 on the transfer car 40 and during transport of the load carrier by the transfer car. Accordingly, the wheels 46 and 82 should be of sufficient width so as to provide a substantial area for contact and also each of the wheel's peripheral surfaces are designed to enhance frictional engagement, such as roughening or grooving.

The operation of the preferred embodiment of the present invention which has thus far been described is as follows:

Initially it will be assumed that the first vehicle or load carrier 16 has been operating in one of the given aisles 14 and it is now desired to transfer the load carrier to another of the aisles 14' for operation. The second vehicle or transfer car 40 is positioned at the end of the aisle 14 in which the load carrier is presently located, such that the berth 60 of the transfer car is aligned with the aisle 14.

Referring to FIG. 4, the load carrier 16 is now operated under its own power so as to back down the aisle longitudinally toward the transfer car 40 and then back from the end of the aisle 14 into the transfer car berth 60. During this movement, the drive wheels 22 and 23 of the load carrier will be driven by the drive motor 24 of the load carrier to effect longitudinal movement of the load carrier on the surface of floor 62. Since the drive wheels 22 and 23 are connected to wheel 46 by way of the drive shaft 42, sprocket 44, drive chain 54, sprocket 52, and drive shaft 48, wheel 46 will continuously idle simultaneously with rotation of the wheels 22 and 23.

As the load carrier 16 is backed into the berth 60 of the transfer car 40, the rear wheels 22 and 23 will begin to ride up the inclined ramps 58 as shown in FIG. 4 under the power of wheels 22 and 23 to elevate the rear of the load carrier above the surface of floor 62. Subsequently, the front of the load carrier will also be operated by the contact between rollers 74 and ramps 76. As movement of the load carrier into the berth continues, the wheels 22 and 23 will become positioned at the top of the ramp, and the wheel 46 will come into contact with the surface of wheel 82, as shown in the dot and dash lines in FIG. 4. At this point the load carrier 16 will continue to be propelled backward into the berth of the transfer car due to both the driving action of wheels 22 and 23 at the top of the ramp and the driving action of the frictional contact of the rotating wheel 46 against the surface of braked wheel 82, the brake disc 84 being locked to prevent rotation of shaft 80.

The frictional contact of surface of wheel 46 against the brake stationary wheel 82 will cause the wheel 46 to ride upward around the periphery of wheel 82 toward top dead center of wheel 82. As wheel 46 rides upward over wheel 82, the load carrier will be moved further back into the berth of the surface of transfer car and wheels 22 and 23 will be lifted into clearing relationship above the ramps 58 and transfer car bed 72 as shown in FIG. 5. As the wheel 46 continues its traverse over the braked wheel 82, it will pass top dead center and move slightly down and beyond top dead center of wheel 82, again lowering wheels 22 and 23 as shown in FIG. 6. In this lowered position wheels 22 and 23 will contact the idler roller 68 at the ends of the arms 64 of the ramps 58 and the lowermost perimeter of wheels 22 and 23 may extend through the openings in the transfer car deck. Thus, wheels 22 and 23 will bias downward the idler rollers 68 and their arms 64, causing the ramps 58 to pivot about their pivot axis 66 to a retracted position. Retraction of the ramps to the position shown in FIG. 6 insures that the ramps will not drag on the floor 62 during transfer of the load carrier. Also positioning of the wheel 46 past top dead center of wheel 82 as shown in FIG. 6 prevents accidental movement of the load carrier relative to the transfer car during transfer. If desired, additional locking means (not shown) in the form either of a manually or electrically actuated locking pin may be provided to further lock the load carrier and transfer car together during transport.

Another advantage realized by rolling of the wheel 46 past top dead center of wheel 82 is a reduction in the power required to elevate the front of the load carrier upon ramps 76, since the rollers 74 will be assisted during the last part of their ascent up the incline of ramp 76 by this gravitational roll over movement of the wheel 46. This assist is particularly desirable since the front of the load carrier which carries the lift platform 28 is generally heavier.

Once the load carrier has been fully positioned in the transport position on the transfer car as shown in FIG. 6, the brake cylinder 86 may be released. Thereby continued operation of the load carrier drive motor 24 will cause the power transmitted to the drive shaft 42 to be transferred through sprocket 44, chain 54, sprocket 52, shaft 48 and wheel 46 and from there to the surface of wheel 82 which is in contact with wheel 46, causing the latter now unbraked surface to rotate. Rotation of wheel 82 is transferred to the shaft 80 and gears 88 to drive the drive wheels 92 of the transfer car. Thus, it will be seen that both the load carrier 16 and the transfer car 40 may be effectively and simply driven by one motor only, the motor 24 of the load carrier.

Once the berth 60 of the transfer car on which the load carrier is supported, has been driven over the surface of floor 62 and aligned with the aisle 14' in which it is now desired to operate the load carrier, the brake disc 84 is again set and the load carrier motor 24 is reversed. Thereby, since setting of the brake disc 84 locks the wheel 82 against rotation, wheel 46 will ride up past top dead center of wheel 82 to the position shown in FIG. 5 in which the wheels 22 and 23 are slightly suspended in and in which the ramps 58 are lowered, and then will continue beyond top dead center as shown in FIG. 4 whereby the load carrier is driven by wheels 22 and 23 down the ramp 58 and onto the surface of floor 62 out into aisle 14'.

It should be understood that the embodiment of the present invention which has been described is merely illustrative of one of the applications of the principles of the invention. Numerous modifications may be made by those skilled in the art without departing from the true sprirt and scope of the invention.

What is claimed is:

1. A multivehicle arrangement comprising
a first vehicle including load handling means mounted thereon operative to transfer a load to and from said first vehicle,
a second vehicle supported for movement on a substantially horizontal surface for transporting said first vehicle over and parallel to said surface when said first vehicle has been positioned in a transport position on said second vehicle, said first vehicle also being movable on said surface when off of said second vehicle and movable in a given direction onto and off of said vehicle,
first drive means for propelling said first vehicle when said first vehicle is not in said transport position on said second vehicle, said first drive means including first support means for drivingly supporting said first vehicle for movement upon said surface,
second means for propelling said second vehicle, said second means for propelling including second support means for drivingly supporting said second vehicle for movement upon said surface,
first and second ends on said first vehicle, said ends being spaced from each other in said given direction of movement, first and second elevation means adjacent said first and second ends of said first vehicle and mounted in spaced relation to each other on said first vehicle for elevating said first vehicle above said surface as said first vehicle is being propelled by said first drive means to move onto said second vehicle, third and fourth elevation means spacedly mounted on said second vehicle and operably engageable with a respective one of said first and second elevation means, said third elevation means including means engaged by at least a portion of said first support means as said first vehicle is moved onto said second vehicle and gravitational elevation assist means distinct from said first support means of said first vehicle and adjacent said first end of said first vehicle when said vehicle is in said transport position, said elevation assist means gravitationally assisting the elevation of said second end of the first vehicle by moving said first end of said first vehicle downwardly as said second end is moved upwardly on said fourth elevation means, and power coupling means, also distinct from said first support means of said first vehicle, coupling said first and second vehicles together automatically in response to the action of said first elevation means and said gravitation assist means and when said first vehicle is in said transport position for transferring power from said first drive means to said second means for propelling said second vehicle.

2. In the arrangement of claim 1 wherein said coupling means mechanically couples said first and second drive means such that said first drive means mechanically drives said second drive means.

3. In the arrangement of claim 1 wherein said power coupling means includes a first moving surface and a second surface positioned to engage with said first moving surface when said first vehicle is fully positioned for transport by said second vehicle.

4. In the arrangement of claim 3 wherein said power coupling means includes brake means for locking said second surface against movement when said first vehicle is being positioned for transport by said second vehicle and unlocks said second surface such that said first moving surface drives said second surface to propel said second vehicle.

5. In the arrangement of claim 3 wherein said first and second surfaces comprise rotatable wheel means, respectively, and brake means for locking said second surface wheel means against rotation, said first surface wheel means contacting said second surface wheel means at a location on the periphery of said second surface wheel means before top dead center of said second surface wheel means and riding ocver the periphery of said second surface wheel means to a location beyond said top dead center when said first vehicle is fully positioned for transport by said second vehicle.

6. In the arrangement of claim 3 wherein said first support means for supporting said first vehicle includes a third moving surface spaced from said first moving surface, said first vehicle normally being propelled upon said third moving surface when said first and second surfaces are disengaged, and power transmitting means coupling said first surface to said third surface for simultaneous movement of said first surface and third surface.

7. In the arrangement of claim 6 wherein said third moving surface continuously idles when said first surface is in contact with said second surface and said second vehicle is being propelled.

8. In the arrangement of claim 1 including a plurality of spaced storage frames arranged in spaced relationship to each other and defining a plurality of aisles therebetween, wherein said first vehicle comprises a load carrier movable in said aisles, and said second vehicle comprises a transfer vehicle for receiving said load carrier thereon for transfer of said load carrier across the ends of the aisles.

9. In the arrangement of claim 1 wherein said power coupling means includes an inclined surface.

* * * * *